United States Patent
Yin et al.

(10) Patent No.: US 8,387,069 B2
(45) Date of Patent: Feb. 26, 2013

(54) METHOD TO SUPPORT DYNAMIC OBJECT EXTENSIONS FOR COMMON INFORMATION MODEL (CIM) OPERATION AND MAINTENANCE

(75) Inventors: Jianwen Yin, Round Rock, TX (US); Timothy Abels, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 1037 days.

(21) Appl. No.: 11/460,778

(22) Filed: Jul. 28, 2006

(65) Prior Publication Data

US 2008/0127073 A1 May 29, 2008

(51) Int. Cl.
G06F 3/00 (2006.01)
G06F 9/44 (2006.01)
G06F 9/45 (2006.01)

(52) U.S. Cl. ......... 719/316; 719/318; 717/116; 717/146
(58) Field of Classification Search .................. None
See application file for complete search history.

(56) References Cited

U.S. PATENT DOCUMENTS

| | | | | |
|---|---|---|---|---|
| 6,052,528 | A * | 4/2000 | Dechamboux | 717/116 |
| 6,317,748 | B1 | 11/2001 | Menzies et al. | 707/103 |
| 6,427,168 | B1 | 7/2002 | McCollum | 709/224 |
| 6,775,700 | B2 | 8/2004 | Cheng et al. | 709/225 |
| 6,816,869 | B2 | 11/2004 | Kagalwala et al. | 707/103 |
| 6,862,736 | B2 * | 3/2005 | Hudis et al. | 719/316 |
| 6,961,730 | B2 | 11/2005 | Kagalwala et al. | 707/102 |
| 6,971,090 | B1 | 11/2005 | Gruttadauria et al. | 717/136 |
| 6,990,499 | B2 | 1/2006 | Kagalwala et al. | 707/103 R |
| 7,043,732 | B2 | 5/2006 | Mandal et al. | 719/310 |
| 7,043,738 | B2 | 5/2006 | Mandal et al. | 719/328 |
| 7,054,853 | B2 | 5/2006 | Johnson et al. | 707/2 |
| 7,380,249 | B2 * | 5/2008 | Hudis et al. | 719/316 |
| 2001/0027470 | A1 * | 10/2001 | Ulmer et al. | 709/203 |
| 2002/0004815 | A1 * | 1/2002 | Muhlestein et al. | 719/318 |
| 2002/0091809 | A1 | 7/2002 | Menzies et al. | 709/223 |
| 2002/0107872 | A1 | 8/2002 | Hudis et al. | 707/104.1 |
| 2002/0144009 | A1 | 10/2002 | Cheng et al. | 709/314 |
| 2002/0156790 | A1 | 10/2002 | Kagalwala et al. | 707/100 |
| 2002/0188766 | A1 * | 12/2002 | Vuppula | 719/318 |
| 2002/0199022 | A1 | 12/2002 | Tsang et al. | 709/246 |

(Continued)

OTHER PUBLICATIONS

Common Information Model (CIM) Core Model, Version 2.4, Aug. 30, 2000, Distributed Management Task Force, Inc. pp. 1-54.*

(Continued)

Primary Examiner — Tuan Dao
(74) Attorney, Agent, or Firm — Hamilton & Terrile, LLP; Stephen A. Terrile

(57) ABSTRACT

An improved system and method is disclosed for making the Common Information Model (CIM), produced by the Distributed Management Task Force (DMTF), more flexible and extensible without requiring changes to it or its existing implementations. MultipleInheritance associations are implemented to define extension abstract classes for managed element information and to create static and dynamic add-in classes, all operable to reference the CIM schema class. Ambiguity is mitigated by not allowing properties of different data types to have the same name in super classes that are used for MultipleInheritance associations. Data integrity is facilitated by merging class properties of the same name and data type through the use of a Min algorithm. Concrete user classes are derived from new abstract classes such that management functionality is enabled for managed element properties. A polymorphic object pointer is implemented using a PolymorphicPointer association to facilitate traversal or the resulting class hierarchies and inheritance trees.

18 Claims, 8 Drawing Sheets

U.S. PATENT DOCUMENTS

| | | | |
|---|---|---|---|
| 2003/0004956 A1 | 1/2003 | Johnson et al. | 707/100 |
| 2003/0004963 A1 | 1/2003 | Kagalwala et al. | 707/103 R |
| 2003/0105732 A1* | 6/2003 | Kagalwala et al. | 707/1 |
| 2003/0172088 A1 | 9/2003 | Mandal et al. | 707/200 |
| 2003/0177477 A1* | 9/2003 | Fuchs | 717/136 |
| 2003/0204557 A1 | 10/2003 | Mandal et al. | 709/202 |
| 2003/0217195 A1 | 11/2003 | Mandal et al. | 709/330 |
| 2004/0015889 A1 | 1/2004 | Todd et al. | 717/137 |
| 2005/0027850 A1 | 2/2005 | Menzies et al. | 709/223 |
| 2005/0033795 A1* | 2/2005 | Wood | 709/200 |
| 2005/0050081 A1 | 3/2005 | Kagalwala et al. | 707/100 |
| 2005/0071363 A1 | 3/2005 | Chen et al. | 707/102 |
| 2005/0108725 A1* | 5/2005 | Hudis et al. | 719/316 |
| 2005/0193109 A1 | 9/2005 | Hudis et al. | 709/223 |
| 2005/0235339 A1 | 10/2005 | Lwo | 726/2 |
| 2005/0273788 A1 | 12/2005 | Gupta | 719/310 |
| 2005/0278354 A1 | 12/2005 | Gupta et al. | 707/100 |
| 2006/0015848 A1* | 1/2006 | Schwarzmann | 717/116 |
| 2006/0069761 A1 | 3/2006 | Singh et al. | 709/222 |
| 2006/0101189 A1 | 5/2006 | Chandrasekaran et al. | 711/6 |
| 2006/0106863 A1 | 5/2006 | Ramasamy Venkatraj et al. | 707/103 R |
| 2006/0155912 A1 | 7/2006 | Singh et al. | 711/6 |
| 2006/0242284 A1* | 10/2006 | Savage | 709/223 |
| 2007/0073877 A1* | 3/2007 | Boykin et al. | 709/225 |
| 2007/0169040 A1* | 7/2007 | Chen | 717/146 |

OTHER PUBLICATIONS

XML for CIM Model Exchange, A. deVos et al., 2001, p. 1-7.*
Unified Service Level Monitoring using CIM, Markus Debusmann, 2003, p. 1-10.*
A configurable type hierarchy index for OODB, Thomas A. Mueck, 1997, p. 1-21.*
Net System Management Services, Alexander Golomshtok, 2003, pp. 1-67.*
CIM Reference Guide, Dec. 2001, Dell Computer Corporation, pp. 1-108.*
CIM Tutorial, Distributed Management Task Force, Inc, 2002-2003, pp. 1-105.*

* cited by examiner

METHOD TO SUPPORT DYNAMIC OBJECT EXTENSIONS FOR COMMON INFORMATION MODEL (CIM) OPERATION AND MAINTENANCE

BACKGROUND OF THE INVENTION

1. Field of the Invention

The present invention relates in general to the field of information handling systems and more specifically, to systems management.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems continue to grow in power, capabilities and variety, and with the advent of the Internet, they have also become more numerous and more distributed. As a result, their management has become increasingly complex, in part due to the growing heterogeneity of the elements that comprise them and the diversity of their associated management environments. In response, the Distributed Management Task Force (DMTF) has developed frameworks that facilitate the interoperable exchange of management information between managed elements and corresponding management systems. One of these frameworks is the Common Information Model (CIM), which provides a consistent definition and structure of management information through the use of object-oriented techniques. As a conceptual information model, the CIM is structured such that managed environments can be viewed as collections of interrelated systems, each of which is comprised of a number of discrete elements.

The CIM, comprised of a specification and a schema, allows management-related information about these elements to be transparently exchanged between management systems. The specification describes an object-oriented meta model based on the Unified Modeling Language (UML) and defines how the CIM can be integrated with other management models. These include, but are not limited to, Simple Network Management Protocol (SNMP) Management Information Base (MIB) or DMTF Management Information Format (MIF). The CIM schema provides a set of classes with properties, methods and associations that define how managed elements in an environment are represented as a common set of objects. In the CIM model, managed objects such as processors, sensors and fans are presented as CIM classes, with the relationships between these managed objects presented through association classes. This hierarchical, object-oriented architecture facilitates the tracking and depiction of the often complex interdependencies and associations between managed objects.

However, the CIM object model presents certain limitations in its current state. For example, multiple inheritances are not supported, requiring inefficient and sometimes redundant traversal of classes comprising the model. Lack of support for multiple inheritances also makes it difficult to build CIM clients capable of possessing complete knowledge of the model. In addition, since class, version, security, service level, and maintenance information are modeled in different classes, there is no easy way to extend the model to support new elements. Furthermore, limitations in the object model used by the CIM and the CIM object manager (CIMOM) does not enable requiring the provision of concrete user class information such as version, security, service level, or other operational maintenance requirements. Likewise, it does not enable an abstract base class, template, or namespace that drives user class parameter requirements. The further lack of polymorphism to traverse its current inheritance hierarchy, combined with the absence of linking or embedding options for performance and security, places additional constraints on its use. In view of the foregoing, there is a need to make the CIM more flexible and extensible without requiring changes to it or its existing implementations.

SUMMARY OF THE INVENTION

In accordance with the present invention, an improved system and method is disclosed for making the Common Information Model (CIM), produced by the Distributed Management Task Force (DMTF), more flexible and extensible without requiring changes to it or its existing implementations. In different embodiments of the invention, extension abstract classes are defined for version, control, security, service level, operational maintenance requirements, and other managed element information. These extension classes are operable to reference the CIM schema class through the implementation of MultipleInheritance associations, which also enable the definition of new abstract classes for each managed element category. In an embodiment of the invention, static and dynamic add-in classes are likewise enabled through the implementation of MultipleInheritance associations.

In an embodiment of the invention, ambiguity is mitigated by not allowing properties of different data types to have the same name in super classes that are used for MultipleInheritance associations. In an embodiment of the invention, data integrity is facilitated by merging class properties of the same name and data type through the use of a Min algorithm. In another embodiment of the invention, MultipleInheritance associations are implemented in support of CIM Object Manager (CIMOM) operations. In this embodiment of the invention, when a recursive enumeration action of any of its super classes is triggered through the CIMOM, the instance of the class is listed as an instance of the super class.

In an embodiment of the invention, concrete user classes are derived from new abstract classes such that management functionality is enabled for, but not limited to, version, control, security, service level, operational maintenance requirements, and other managed element properties. In an embodiment of the invention, a polymorphic object pointer is implemented using a PolymorphicPointer association to facilitate traversal through class hierarchies and inheritance trees. Those of skill in the art will understand that many such embodiments and variations of the invention are possible, including but not limited to those described hereinabove, which are by no means all inclusive.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An improved system and method is disclosed for making the Common Information Model (CIM), produced by the Distributed Management Task Force (DMTF), more flexible and extensible without requiring changes to it or its existing implementations. In different embodiments of the invention, MultipleInheritance associations are implemented to define extension abstract classes for managed element information and to create static and dynamic add-in classes, all operable to reference the CIM schema class. In an embodiment of the invention, a polymorphic object pointer is implemented using a PolymorphicPointer association to facilitate traversal through class hierarchies and inheritance trees.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
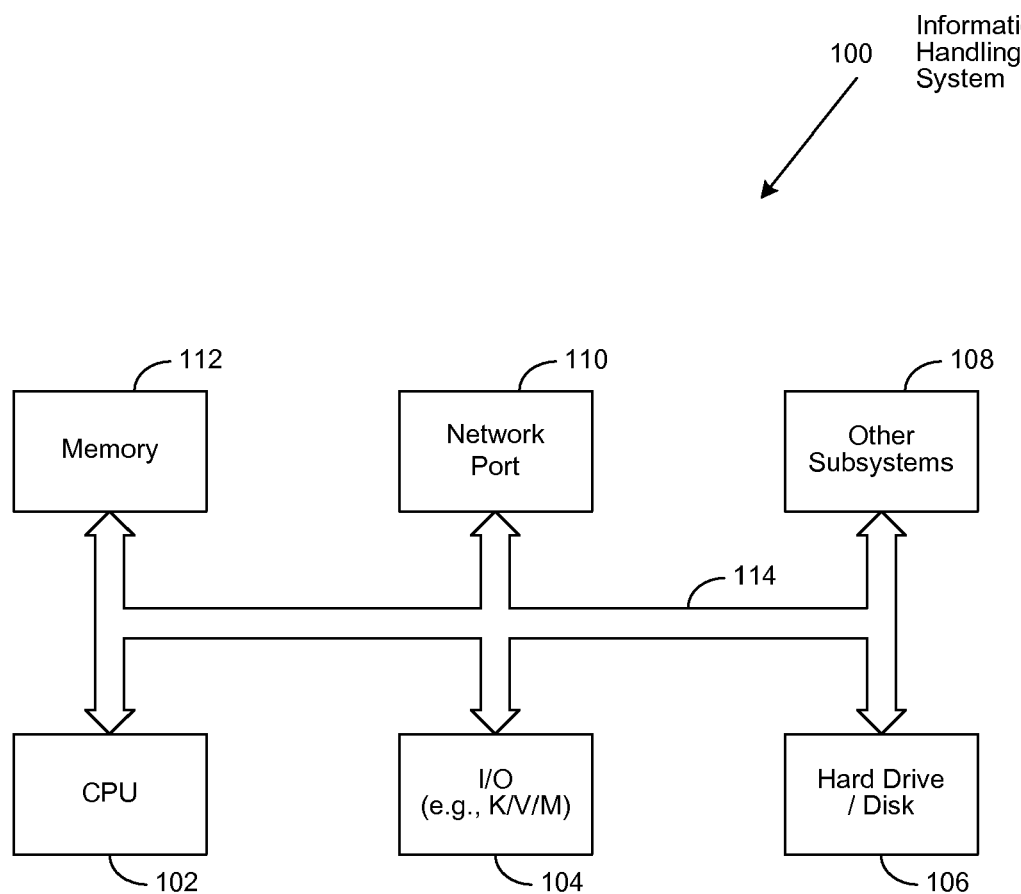
FIG. 1 is a generalized illustration of an information handling system that can be used to implement the method and apparatus of the present invention.

FIG. 1 is a generalized illustration of an information handling system 100 that can be used to implement the system and method of the present invention. The information handling system includes a processor (e.g., central processor unit or "CPU") 102, input/output (I/O) devices 104, such as a display, a keyboard, a mouse, and associated controllers, a hard drive or disk storage 106, various other subsystems 108, network port 110, and system memory 112, all interconnected via one or more buses 114.

Figure 2:
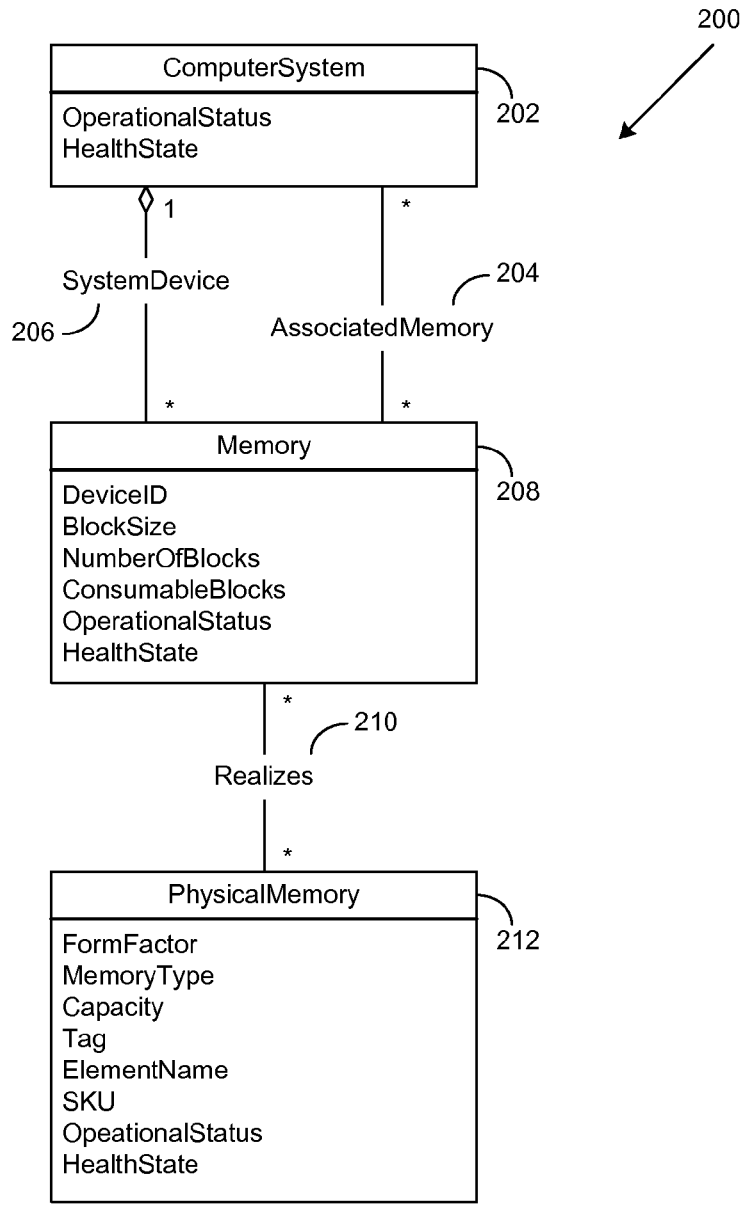
FIG. 2 depicts a generalized prior art class diagram of a Common Information Model (CIM) system memory profile.

FIG. 2 depicts a generalized prior art class diagram of a Common Information Model (CIM) system memory profile 200, defining a subset of the CIM schema relating to system memory. In this profile, the relationship between the logical aspects of system memory, physical memory and the computer system is depicted. For example, ComputerSystem class 202 is associated with Memory class 208 through SystemDevice 206 and AssociatedMemory 204 classes, and Memory class 208 is associated with PhysicalMemory class 212 through Realizes class 210.

Figure 3:
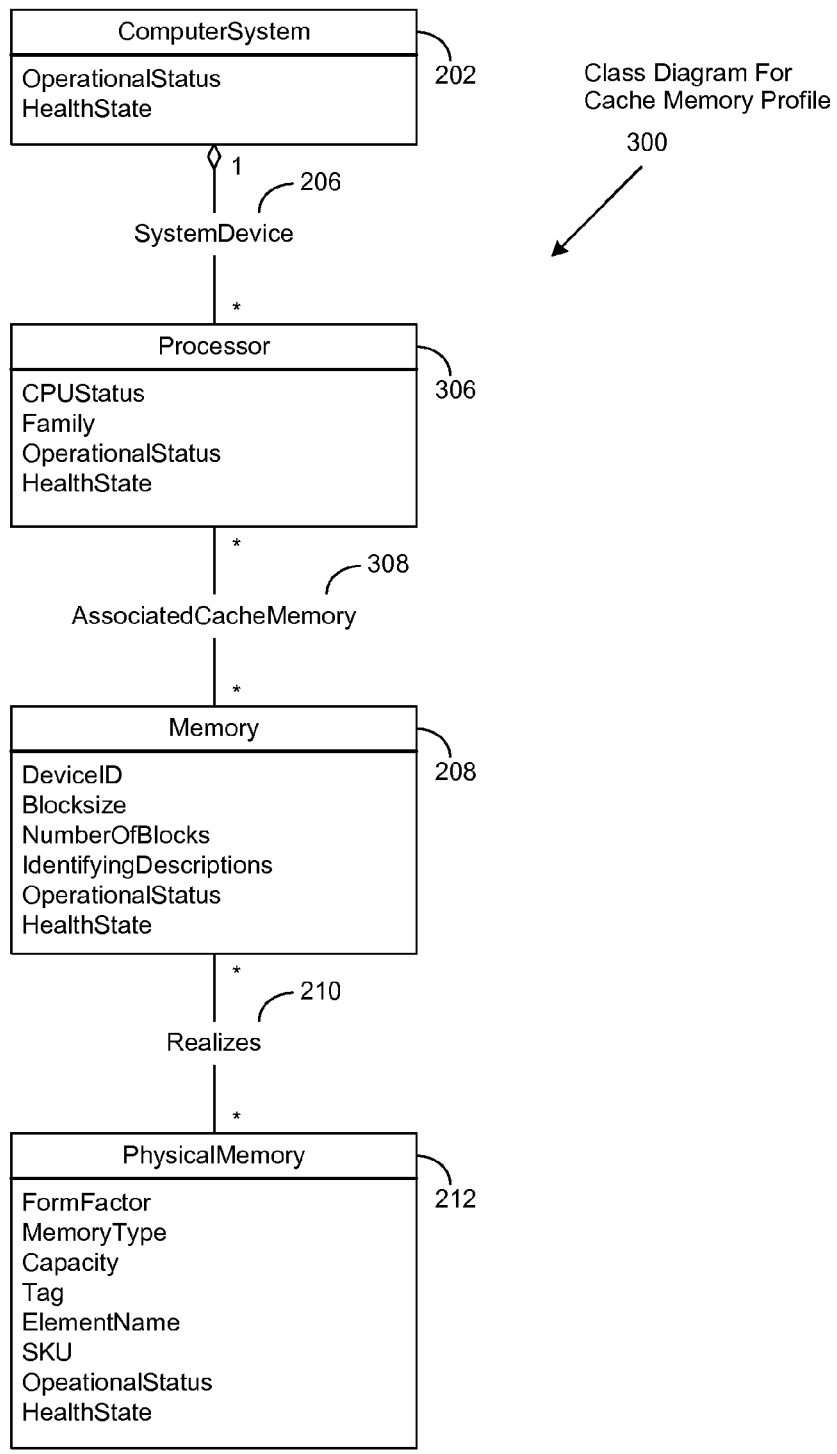
FIG. 3 depicts a generalized prior art class diagram of a CIM cache memory profile.

FIG. 3 depicts a generalized prior art class diagram of a CIM cache memory profile 300, defining a subset of the CIM schema relating to cache memory. In this profile, the relationship between the logical aspects of cache memory, physical memory, the processor, and the computer system is depicted. For example, ComputerSystem class 202 is associated with Processor class 306 through SystemDevice class 206. Processor class 306 is associated in turn with Memory class 208 through AssociatedCacheMemory class 308 and MemoryClass 208 is associated with PhysicalMemory class 212 through Realizes class 210.

It will be apparent to those of skill in the art that it is necessary to traverse AssociatedMemory class 204 and AssociatedCacheMemory class 308, beginning with Memory class 208, in order to determine whether a predetermined memory in the profiles depicted in FIGS. 2 and 3 is system memory or cache memory. For example, if there is an instance of ComputerSystem class 202 associated with an instance of Memory class 208 through AssociatedMemory class 204, then the memory is system memory. Similarly, if there is an instance of Processor class 306 associated with an instance of Memory class 208 through AssociatedCacheMemory class 308, then the memory is cache memory.

Regardless, in order to determine the physical aspect of a predetermined memory, an administrator must go through the Realizes class association 210 to identify its associated PhysicalMemory class 212 instances. Additionally, while the OperationalStatus and HealthState properties redundantly comprise ComputerSystem class 202, Processor class 306, Memory class 208, and PhysicalMemory class 212, their operational meaning is different for computer systems and memory. Furthermore, there is no need for this information to be redundantly stored in both the logical and physical aspects of the memory element. In addition, inconsistencies between which properties are mandatory for different CIM profiles such as, but not limited to, those depicted in FIGS. 2 and 3 creates other system information management issues.

Figure 4:
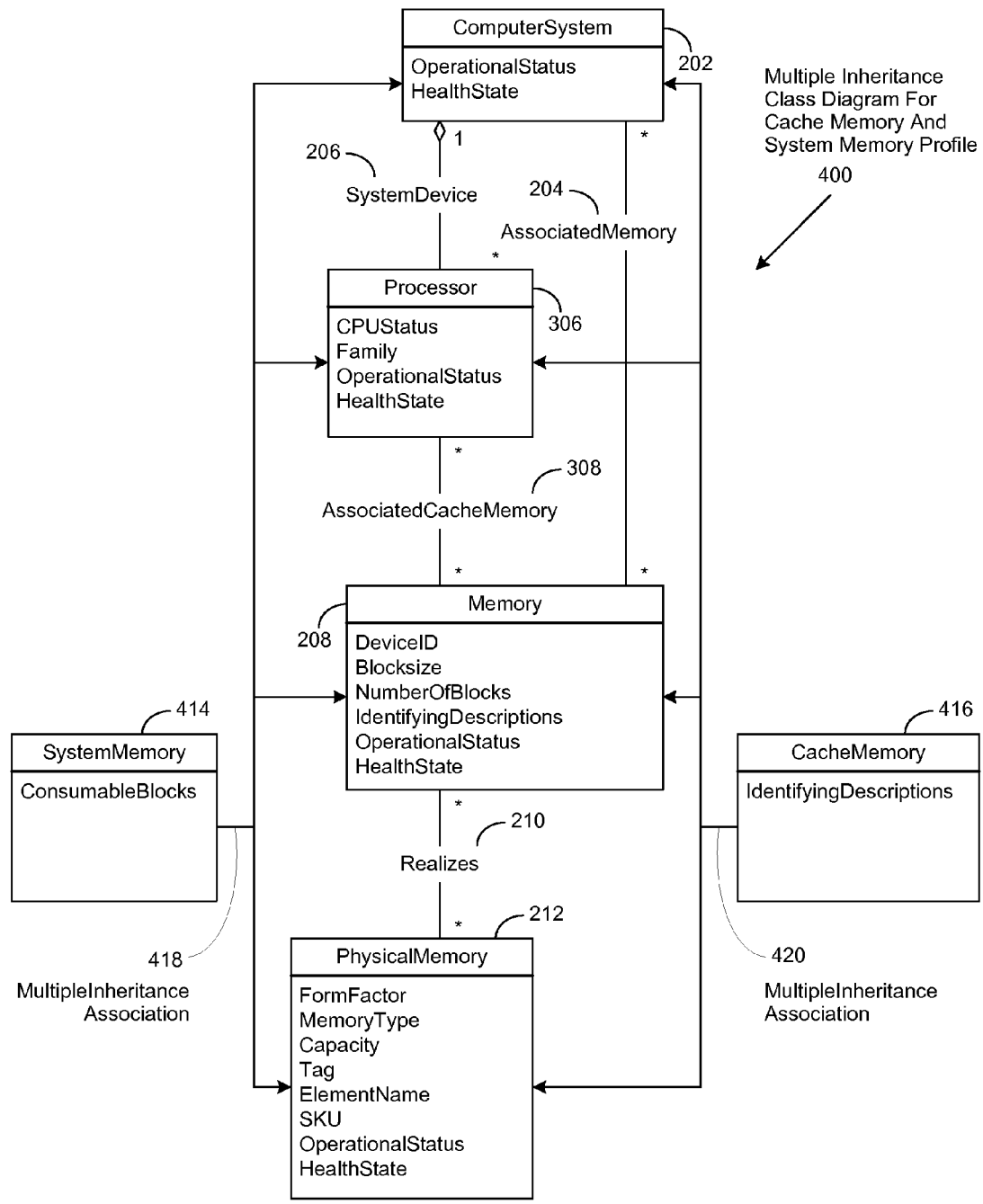
FIG. 4 depicts a generalized class diagram of a CIM cache and system memory profile implementing MultipleInheritance associations in accordance with an embodiment of the invention.

FIG. 4 depicts a generalized class diagram of a CIM cache memory and system memory profile 400 implementing multiple inheritance in accordance with an embodiment of the invention. In this profile, the relationship between the logical aspects of system and cache memory, physical memory, the processor, and the computer system is depicted through implementation of MultipleInheritance associations 418 and 420. For example, ComputerSystem class 202 is associated with Processor class 306 through SystemDevice class 206, and is likewise associated with Memory class 208 through AssociatedMemory class 204. Processor class 306 is associated in turn with Memory class 208 through AssociatedCacheMemory class 308 and MemoryClass 208 is associated with PhysicalMemory class 212 through Realizes class 210. In an embodiment of the invention, SystemMemory class 414 implements MultipleInheritance property association 418 from ComputerSystem class 202, Processor class 306, Memory class 208 and PhysicalMemory class 212. In an embodiment of the invention, CacheMemory class 416 similarly implements MultipleInheritance property association 420 from ComputerSystem class 202, Processor class 306, Memory class 208 and PhysicalMemory class 212.

Those of skill in the art will recognize that the implementation of MultipleInheritance associations 418 and 420 in the profile allow Memory class 208 to be comprised of a set of common, mandatory properties inherited by both SystemMemory class 414 and CacheMemory class 416. In another embodiment of the invention, subclasses derived from multiple classes inherit properties from all associated super classes, including their qualifiers as defined in the CIM schema. In an embodiment of the invention, ambiguity is mitigated by not allowing properties of different data types to have the same name in super classes that are used for multiple inheritance associations. In another embodiment of the invention, data integrity is facilitated by merging class properties of the same name and data type through implementation of a Min algorithm. For example, OperationalStatus and the HealthState properties are merged by the Min Algorithm and are defined by data type. If the data type is an integer, it will be the minimum value of those with the same name and type. If it is Boolean, it will be min(false, true)=false, etc.

Figure 5:
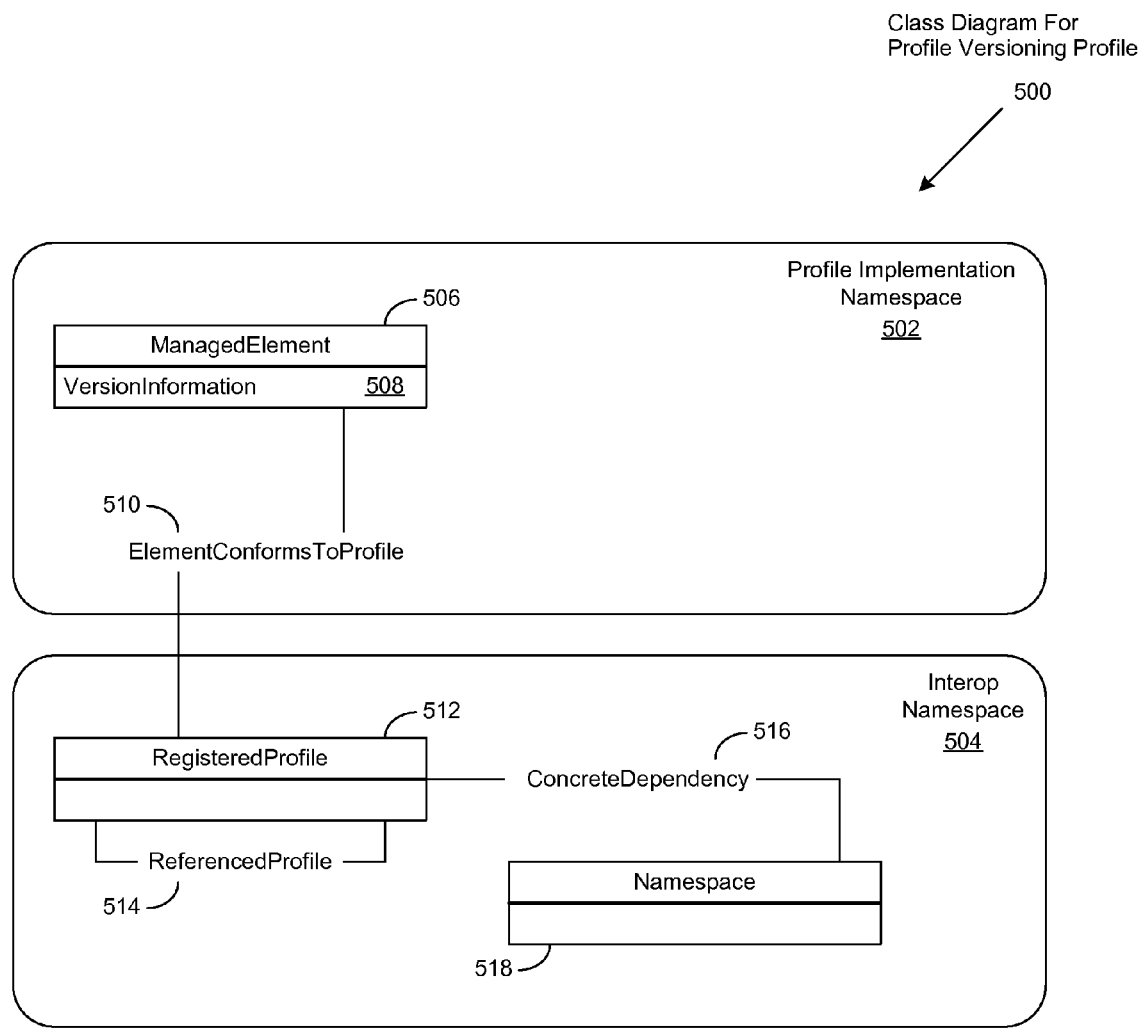
FIG. 5 depicts a generalized prior art class diagram of a CIM profile versioning profile.

In another embodiment of the invention, MultipleInheritance associations are implemented in support of CIM Object Manager (CIMOM) operations. In this embodiment of the invention, when a recursive enumeration action of any of its super classes is triggered through the CIMOM, the instance of the class is listed as an instance of the super class, with the following results:

a. Only properties in the super class will be listed as properties b. The value for properties with the same name will be carried over c. The instance is merged with other instance of the super class FIG. 5 depicts a generalized prior art class diagram of a CIM profile versioning profile 500, defining a subset of the CIM schema relating to the versioning of profiles. CIM profile versioning profile 500 is comprised of profile implementation namespace 502 and interop namespace 504. Profile implementation namespace 502 is comprised of ManagedElement class 506, which is further comprised of VersionInformation property 508. Interop namespace 504 is comprised of RegisteredProfile class 512 and Namespace class 518. RegisteredProfile class 512, comprised of ReferencedProfile class 514, is associated with Namespace class 518 through ConcreteDependency class 516. ManagedElement class 506, comprising profile implementation namespace 502, is associated with RegisteredProfile class 512, comprising interop namespace 514, through ElementConformsToProfile class 510.

Figure 6:
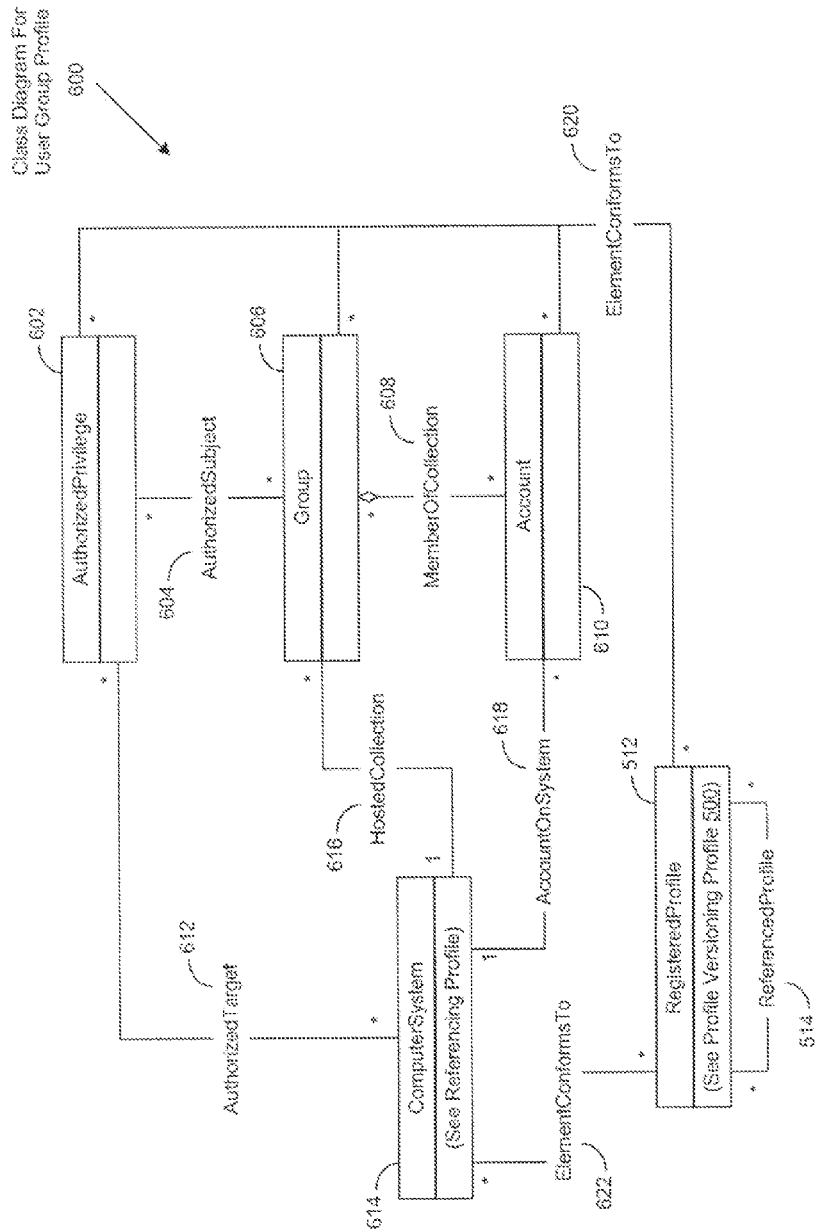
FIG. 6 depicts a generalized prior art class diagram of a CIM user group profile.

FIG. 6 depicts a generalized prior art class diagram of a CIM user group profile 600, defining a subset of the CIM schema relating to user groups. In this class diagram, AuthorizedPrivelege class 602 is associated with Group class 606 through AuthorizedSubject class 604 and associated with ComputerSystem class 614 through AuthorizedTarget class 612. Group class 606 is associated with Account class 610 through MemberOfCollection class 608 and is associated with ComputerSystem class 614 through HostedCollection class 616. Account class 610 is associated with ComputerSystem class 614 through AccountOnSystem class 618. ComputerSystem class 614 is associated with RegisteredProfile class 512 through ElementConformsTo class 622. RegisteredProfile class 512 comprises profile versioning profile 500 of FIG. 5 and is associated with ReferencedProfile class 514, and is further associated with Account class 610, Group class 606, and AuthorizedPrivelege class 602 through ElementConformsTo class 620.

Figure 7:
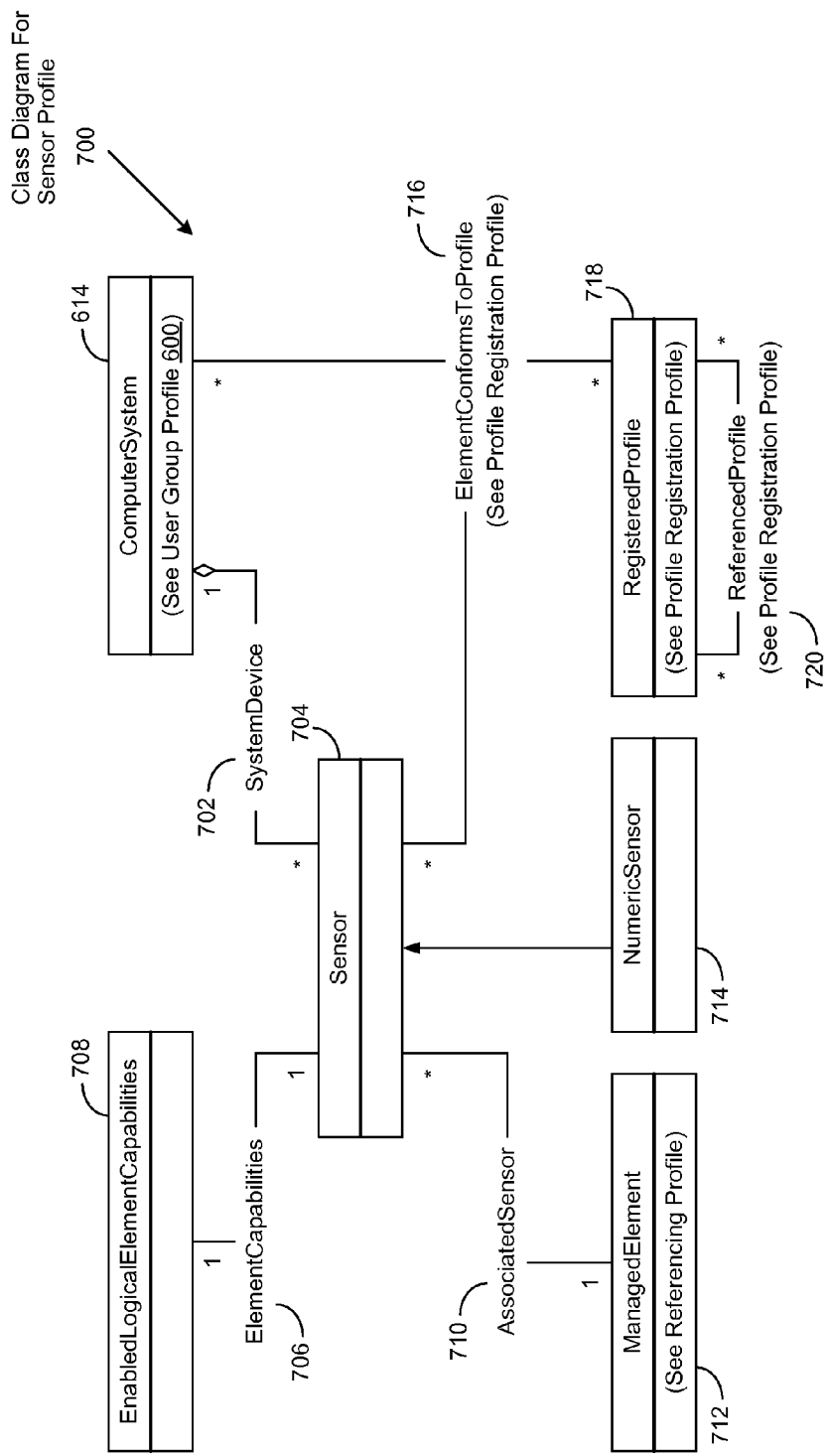
FIG. 7 depicts a generalized prior art class diagram of a CIM sensor profile.

FIG. 7 depicts a generalized prior art class diagram of a CIM sensor profile 700, defining a subset of the CIM schema relating to sensors. In this class diagram, ComputerSystem class 614 comprises user group profile 600 of FIG. 6 and is associated with Sensor class 704 through SystemDevice class 702 and is further associated with Sensor class 704 and RegisteredProfile class 718 through ElementConformsToProfile class 716. RegisteredProfile class 718 is likewise associated with Sensor class 704 through ElementConformsToProfile class 716 and is also associated with ReferencedProfile class 720. NumericSensor class 714 inherits properties from SensorClass 704, which is associated with EnabledLogicalElementsCapabilities class 708 through ElementCapabilities 706, and which is also associated with ManagedElement class 712 through AssociatedSensor class 710.

In FIGS. 5-7, if an authorized user of the management system comprised of profile versioning profile 500, user group profile 600, and sensor profile 700 desires to access the VersionInformation property 508 comprising ManagedElement class 506 in FIG. 5, they must first begin at Sensor class 704 of FIG. 7. They then traverse to ComputerSystem class 614 through SystemDevice class association 702, and then on to RegisteredProfile class 718 through ElementConformsToProfile class association 716. From RegisteredProfile class 718 they would then traverse to ManagedElement class 506 through ElementConformsToProfile class association 508 as depicted in FIG. 5, to access VersionInformation property 508.

Similarly, if an authorized user of the management system comprised of profile versioning profile 500, user group profile 600, and sensor profile 700 attempts to perform a predetermined action on Sensor class 704, they first begin at Account class 610 as depicted in FIG. 6. From Account class 610, they traverse to Group class 606 through MemberOfCollection class association 608 and on to AuthorizedPrivilege class 602 through AuthorizedSubject class association 604. From AuthorizedPrivilege class 602 they then traverse to ComputerSystem class 614 through AuthorizedTarget class association 612 to determine the authorized user's privileges on the sensor's system. Once the authorized user's privileges have been determined, they then traverse from ComputerSystem class 614 to Sensor class 704 through SystemDevice class association 702 as depicted in FIG. 7. As will be apparent to those of skill in the art, traversing from one class to another in the preceding examples requires traversing multiple intermediate classes due to the lack of multiple inheritance support in the CIM model.

Figure 8:
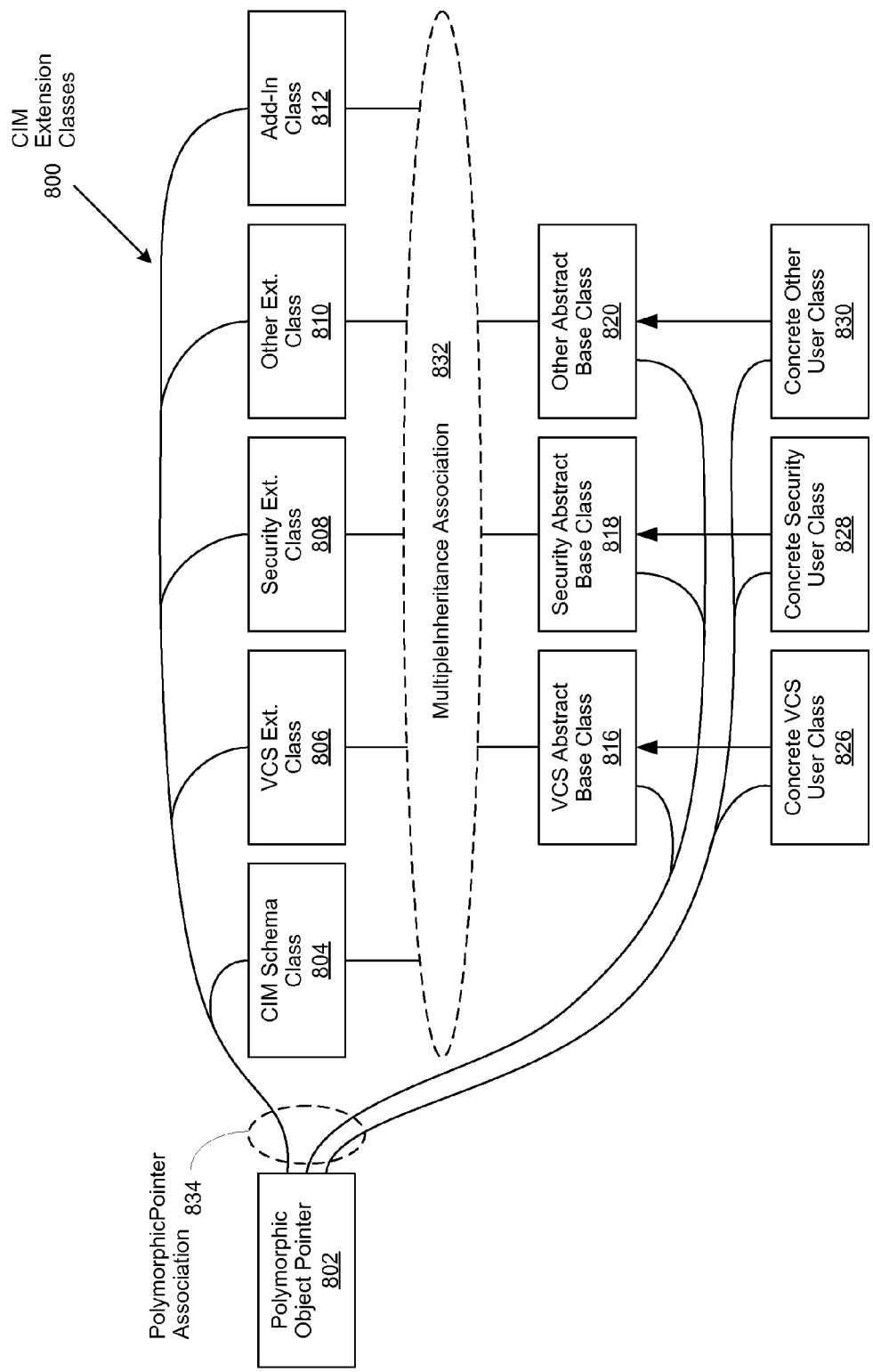
FIG. 8 depicts a generalized block diagram of CIM extension classes as implemented in accordance with an embodiment of the invention.

FIG. 8 depicts a generalized block diagram of CIM extension classes 800 as implemented in accordance with an embodiment of the invention. In an embodiment of the invention, MultipleInheritance association 832 is implemented as described in greater detail hereinabove to associate CIM schema class 804 with version control system (VCS) abstract bass class 816, security abstract base class 818, and other abstract base classes 820 to define VCS extension class 806, security extension class 808, other extension classes 810, and new add-in classes 812.

In another embodiment of the invention, concrete VCS user class 826, concrete security user class 828, and concrete other user classes 830 are respectively derived from VCS abstract base class 816, security abstract base class 818, and other abstract base classes 820. In another embodiment of the invention, polymorphic object pointer classes 802 are implemented through PolymorphicPointer association 834 to shorten CIM client traversals through the class diagram and the inheritance tree. In these and other embodiments of the invention, the CIM becomes more flexible and extensible without requiring changes to it or its existing implementations. Skilled practitioners in the art will recognize that many other embodiments and variations of the present invention are possible. In addition, each of the referenced components in this embodiment of the invention may be comprised of a plurality of components, each interacting with the other in a distributed environment. Furthermore, other embodiments of the invention may expand on the referenced embodiment to extend the scale and reach of the system's implementation.

What is claimed is:

1. An information handling system, comprising:
   a processor operable to perform processing logic operations;
   a plurality of managed elements referenced to a common information model (CIM) schema, wherein said CIM schema comprises CIM classes and CIM subclasses;
   a common-information-model object manager (CIMOM) operable to provide system management information to a CIM client, wherein said system management information is associated with said plurality of managed elements; and
   a system manager comprising processing logic operable to define extension abstract classes comprising multiple inheritance associations, wherein:
      said multiple inheritance associations represent logical representations between a plurality of entities;
      said multiple inheritance associations are used by said extension abstract classes to reference said CIM classes, wherein predetermined CIM subclasses of said managed elements comprise properties defined by two or more of said CIM classes; and
      said CIMOM uses said multiple inheritance associations to provide said system management information to said CIM client.

2. The information handling system of claim 1, wherein said system manager is further operable to connect multiple inheritance classes to parent classes.

3. The information handling system of claim 1, wherein said system manager is further operable to connect multiple inheritance classes to super classes.

4. The information handling system of claim 1, wherein said system manager further comprises a polymorphic object pointer class, wherein said polymorphic object pointer class is used by said system manager to facilitate traversal through class hierarchies.

5. The information handling system of claim 4, wherein said system manager is further operable to connect said polymorphic object pointer class to a plurality of associated classes.

6. The information handling system of claim 1, wherein said system manager is further operable to use said multiple inheritance associations to define new abstract classes for predetermined categories of said managed elements.

7. The information handling system of claim 6, wherein said system manager is further operable to derive concrete user classes from said new abstract classes.

8. The information handling system of claim 1, wherein said system manager is further operable to use said multiple inheritance associations to generate dynamic add-in classes.

9. The information handling system of claim 1, wherein said system manager is further operable to use said multiple inheritance associations to generate static add-in classes.

10. A computer-implementable method of managing elements in an information handling system, comprising:
    using a processor to perform processing logic operations;
    using a plurality of managed elements referenced to a common information model (CIM) schema, wherein said CIM schema comprises CIM classes and CIM subclasses;
    using a common-information-model object manager (CIMOM) to provide system management information to a CIM client, wherein said system management information is associated with said plurality of managed elements; and
    using a system manager comprising processing logic to define extension abstract classes comprising multiple inheritance associations, wherein:
       said multiple inheritance associations represent logical representations between a plurality of entities;
       said multiple inheritance associations are used by said extension abstract classes to reference said CIM classes, wherein predetermined CIM subclasses of said managed elements comprise properties defined by two or more of said CIM classes; and
       said CIMOM uses said multiple inheritance associations to provide said system management information to said CIM client.

11. The computer-implementable method of claim 10, wherein said system manager is further operable to connect multiple inheritance classes to parent classes.

12. The computer-implementable method of claim 10, wherein said system manager is further operable to connect multiple inheritance classes to super classes.

13. The computer-implementable method of claim 10, wherein said system manager further comprises a polymorphic object pointer class, wherein said polymorphic object pointer class is used by said system manager to facilitate traversal through class hierarchies.

14. The computer-implementable method of claim 13, wherein said system manager is further operable to connect said polymorphic object pointer class to a plurality of associated classes.

15. The computer-implementable method of claim 10, wherein said system manager is further operable to use said multiple inheritance associations to define new abstract classes for predetermined categories of said managed elements.

16. The computer-implementable method of claim 15, wherein said system manager is further operable to derive concrete user classes from said new abstract classes.

17. The computer-implementable method of claim 10, wherein said system manager is further operable to use said multiple inheritance associations to generate dynamic add-in classes.

18. The computer-implementable method according to claim 10, wherein said system manager is further operable to use said multiple inheritance associations to generate static add-in classes.

* * * * *